Nov. 14, 1933.    S. P. MILLER    1,935,326
OPERATION OF BY-PRODUCT COKE OVEN
Filed Feb. 25, 1927    3 Sheets-Sheet 3
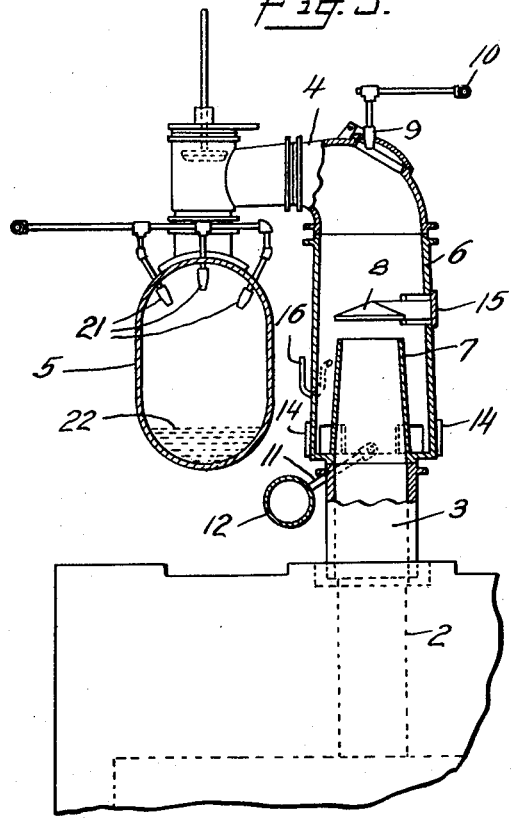
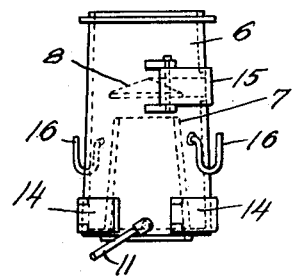
Stuart P. Miller INVENTOR
BY
Pennie Davis Marvin Edmonds
ATTORNEYS

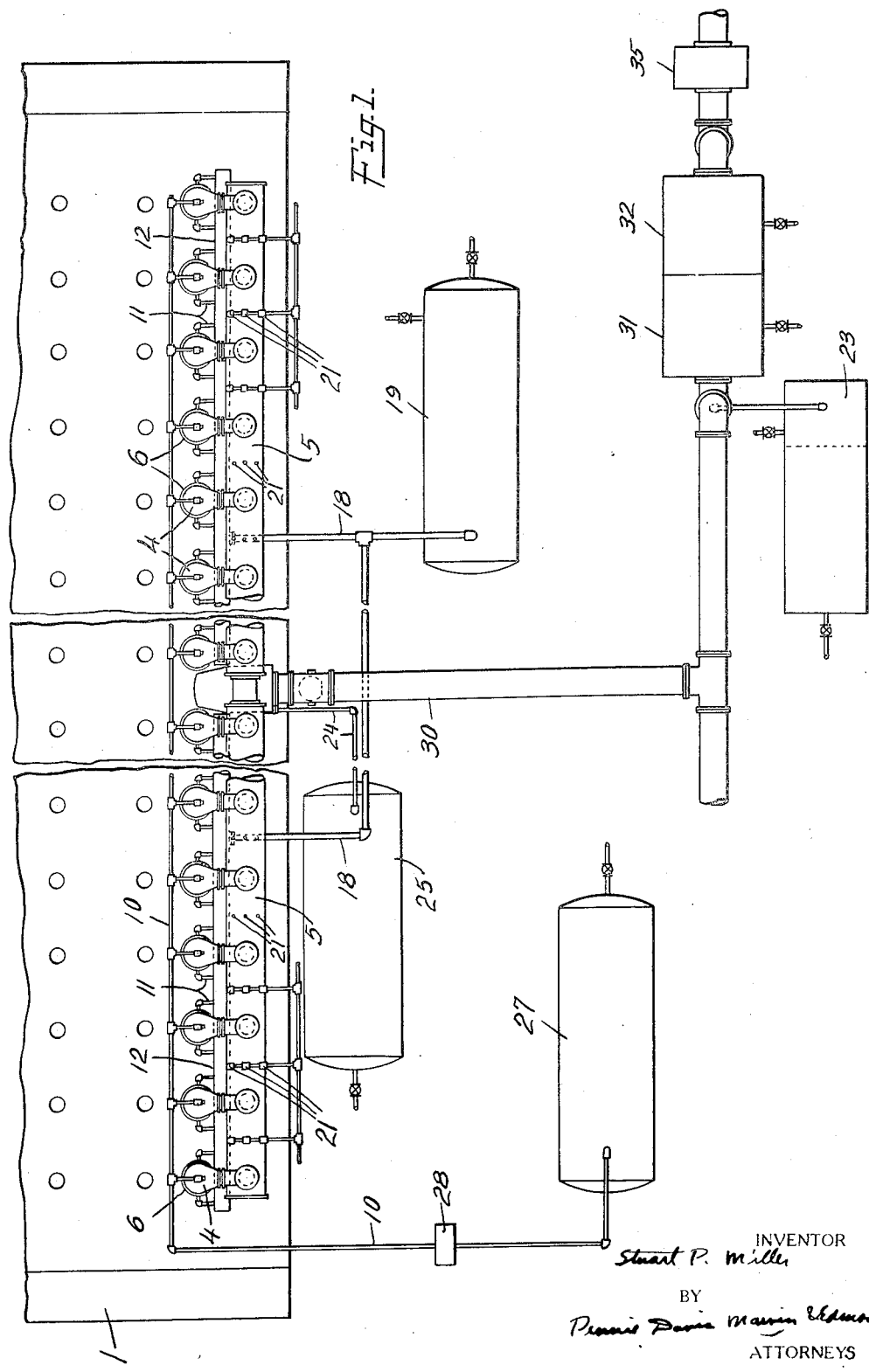

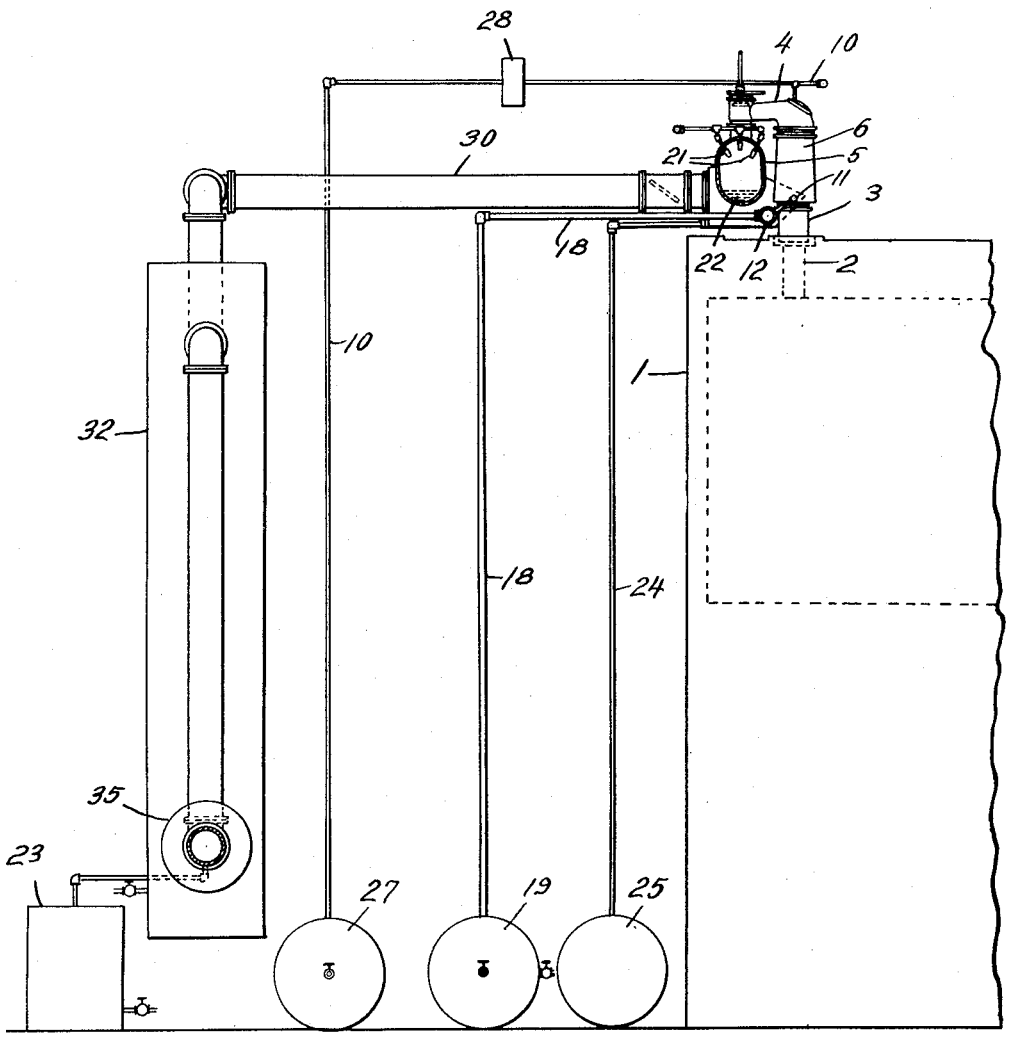

UNITED STATES PATENT OFFICE 1,935,326

OPERATION OF BY-PRODUCT COKE OVEN

Stuart Parmelee Miller, Tenafly, N. J., assignor to The Barrett Company, New York, N. Y., a corporation of New Jersey Application February 25, 1927. Serial No. 170,775

5 Claims. (Cl. 202—30)

This invention relates to improvements in the operation of by-product coke ovens, and more particularly to the collection and treatment of the coke oven gases coming from the coke ovens during operation, and the recovery of tar constituents therefrom.

In the ordinary operation of by-product coke ovens, the gases produced by the coking operations pass from the individual ovens through individual uptake pipes and goose-necks to a collector main common to a battery, or to a number of ovens of the battery. The uptake pipes and goose-necks are commonly exposed to the atmosphere and some cooling of the gases takes place while they are passing therethrough, due to radiation. In the collector main or mains, the gases are commonly sprayed with ammonia liquor, or ammonia liquor and tar, to cool the gases and to throw down heavier tar constituents therefrom; and ammonia liquor sprays are also commonly employed in the goose-necks, particularly for spraying the valve or valves during operation. The hot coke oven gases enter the collector main while still at a high temperature, for example, around 500 to 600° C. or sometimes even higher, and are cooled in the collector main to temperatures which may be around 100° C. or somewhat higher.

According to the present invention, the hot coke oven gases are cooled in the uptake pipes by introducing water or ammonia liquor into them as they pass upwardly therethrough, thus giving gases at a materially lower temperature entering the collector main.

The invention also includes improvements in the operation of the collector main or mains in which such pre-cooled gases, pre-cooled only to a predetermined temperature, are introduced, for the recovery of tar constituents therefrom. The invention also includes improvements in the operation of the collector main for the distillation of tar or oil by utilizing the heat of the pre-cooled gases while they are still at a sufficiently high temperature to bring about effective distillation, but while they are at a sufficiently low temperature to avoid excessive distillation and danger of forming or depositing hard pitch in the collector main.

In the practice of the invention, the hot coke oven gases, as they come from the individual coke ovens, are brought into intimate contact with ammonia liquor in regulated amounts in the individual uptake pipes so that the gases are suddenly cooled to a predetermined lower temperature before they enter the collector main. By spraying or atomizing or otherwise introducing ammonia liquor into the hot coke oven gases while they are at approximately their maximum temperature after leaving the coke ovens, the cooling action of the ammonia liquor can be effectively employed in reducing the temperature of the gases to the desired extent while still leaving the gases sufficiently hot to enable tar or oil to be distilled thereby.

Water may be employed instead of ammonia liquor, but where water or ammonia liquor is employed, and the aqueous liquor subsequently separated, it is separated as ammonia liquor which may advantageously be reutilized for cooling further amounts of gas. For convenience, the ammonia liquor will be referred to as the material employed for the pre-cooling operation.

The ammonia liquor can be brought into contact with the hot coke oven gases in various ways. It may conveniently and advantageously be atomized or sprayed into the hot rising current of coke oven gases so that it is brought into intimate contact in a finely divided state with the hot gases, thus promoting the evaporation of the ammonia liquor and the cooling of the gases.

In order to permit this introduction of ammonia liquor into the hot gases, the individual ovens may be provided with gas outlet pipes of a modified construction such as will enable the ammonia liquor to be sprayed or otherwise introduced directly into a stream of the hot gas immediately after it leaves the coke ovens, without permitting any excess of ammonia liquor to flow downwardly into the coke ovens. The uptake pipe or outlet pipe of each oven may advantageously be a modified uptake pipe, such as hereinafter described, in which the ammonia liquor is sprayed or atomized into a rising current of the hot coke oven gas while this gas is at substantially its maximum temperature. Such a modified uptake pipe is described and illustrated in the application of George E. Brandon, Serial No. 154,746.

By providing all of the ovens of the battery with such modified uptake pipes, all of the hot coke oven gases can be pre-cooled to a greater or less extent before they enter the collector main or mains. The modified uptake pipes are provided with means for collecting the excess of ammonia liquor, together with any tar admixed therewith or thrown down thereby. Such collecting means may be a manifold or main common to a number of the individual uptake pipes, for example, a number corresponding to the number common to a single collector main.

The manner in which the ammonia liquor is brought into direct contact with the hot coke oven gases can be varied. A suitable atomizing or spray nozzle, to which the ammonia liquor is supplied under a sufficient pressure to bring about atomizing or spraying and resulting intimate contact of the ammonia liquor with the hot gases, can advantageously be located in the upper part of the modified uptake pipes to bring the ammonia liquor into intimate contact with the hot gases. A single ammonia liquor spray can be used in each of the individual uptake pipes, or a plurality or series of such sprays, and the rate at which the ammonia liquor is sprayed, as well as its temperature, can be somewhat regulated and controlled.

If only a small amount of ammonia liquor is atomized into the hot coke oven gases, it may be completely vaporized by the heat of the hot gases without any excess ammonia liquor collecting in the bottom of the modified uptake pipes. The hot coke oven gases will nevertheless be materially cooled, owing to the large heat absorption required by the latent heat of vaporization of the ammonia liquor. Such complete vaporization of the ammonia liquor may be obtained, for example, by a prolonged contact of the ammonia liquor with the hot gases, or by fine atomizing of the ammonia liquor into the hot gases, or by limiting the amount of liquor so atomized, or by combinations of these and other regulating features. Instead of completely vaporizing the ammonia liquor sprayed into the gases, it may be only partly vaporized, and the remainder may be collected in the bottom of the modified uptake pipes and drawn off with any tar thrown down thereby. Where the ammonia liquor is not finely atomized, and is showered into the hot gases in a relatively coarse spray, only partial vaporization may take place, and a considerable excess of ammonia liquor may collect in the bottom of the modified uptake pipes. By using a large excess of ammonia liquor, and particularly where it is finely distributed throughout the hot gases, the gases may be cooled to a relatively low temperature by the excess of ammonia liquor employed. By regulating the nature and amount of the ammonia liquor spray, the gases can be cooled, for example, from around 600° C. to a materially lower temperature, which may be, for example, around 300° C. or higher, or which may be materially lower, for example, around 200° C. or in extreme cases may be around 100° C. or somewhat thereabove. Such extreme cooling will not ordinarily be desirable, and, particularly where the collector main is to be operated for the distillation of tar or oil, it is desirable that the pre-cooled gases entering the collector main shall be at a materially higher temperature, for example, around 300° C. or even higher.

The action of the ammonia liquor upon the hot coke oven gases in the uptake pipes causes more or less of the tar constituents, and particularly of the heavier tar constituents, to be thrown down with the ammonia liquor where an excess is employed. In this way, the gases are subjected to a preliminary purification from heavier tar constituents at the same time that they are preliminarily cooled. The tar constituents thrown down by the ammonia liquor are drawn off therewith from the bottom of the individual uptake pipes and passed to a separate manifold or collector main for the ammonia liquor and tar from the individual uptake pipes. Or in case the gases are not to be used for the distillation of tar or oil in the usual collector, the liquid from the several uptake pipes can be delivered thereto through connections provided for that purpose. The gases passing from the individual uptake pipes to the collector main will be not only pre-cooled, but will have an increased content of water vapor therein and will be preliminarily freed or purified from part of the tar constituents, and particularly from heavier tar constituents, where an excess of ammonia liquor spray is employed in the individual uptake pipes.

The precooled gases entering the collector main do not require the extreme cooling that is commonly applied in by-product coke oven operations for cooling the hot gases to a much lower temperature.

Instead of using ammonia liquor in the collector main, all ammonia liquor may be omitted therefrom and tar or oils employed for spraying and further cooling the gases passing through the collector main. By employing tar or oil sprays in this way, the tar or oil can be distilled to a greater or less extent by the gases passing through the collector main, and the gases will themselves be further scrubbed and cleaned from heavier tar constituents, so that a relatively clean mixture of gases and vapors will pass from the collector main through the cross-over main to the condensing system. This mixture of gases and vapors, moreover, will be enriched by the vapors from the distillation of the tar or oil in the collector main, and may therefore be much richer, particularly in lighter oil vapors, than the gases ordinarily passing from a collector main through a cross-over main.

The pre-cooling of the coke oven gases before they enter the collector main so reduces their temperature that their distilling capacity is correspondingly reduced. Nevertheless, the heat contained as sensible heat in hot coke oven gases is so many times greater than that required for distilling an amount of tar produced from these gases, that the pre-cooled gases are still able to distill a large amount of tar at their lowered temperature, while the fact that the gases do not come in conact with the tar at a higher temperature, reduces the danger of over-distillation and production of pitch such as would tend to cause pitching of the main. When tar is sprayed into the collector main, it may be in sufficient amount to cause a rapid current of not undistilled tar or pitch to collect and run through the bottom of the collector main. If the amount of tar is not sufficient to keep the main flushed, additional tar or pitch can be introduced into the ends of the main and caused to flow therethrough to the center box from which the pitch may be withdrawn and recirculated if necessary or desirable. In this way, the tar sprayed into the collector main and the tar or pitch circulated therethrough can be distilled to the desired point to produce pitch of regulated melting point, while danger of pitching of the main is prevented by the flushing of the main with the sprays and with the circulating tar or pitch.

The invention will be further described in connection with the accompanying drawings illustrating certain embodiments of the apparatus of the invention adapted for the practice of the processes of the invention, but it is intended and will be understood that the invention is illustrated by but is not limited to the modifications so illustrated and described.

In the accompanying drawings:

Fig. 1 is a plan view of part of a battery of coke ovens modified to embody the invention;

Fig. 2 is an elevation with parts in section showing part of the coke oven battery of Fig. 1;

Fig. 3 is an enlarged view of part of the apparatus of Fig. 2, with parts in section; and Fig. 4 is an elevation of one form of modified uptake pipes.

The invention is of more or less general application to different types and constructions of by-product coke ovens, such as Semet-Solvay ovens, Koppers ovens, etc. but will be more particularly described and illustrated in connection with by-product coke ovens of the Semet-Solvay type.

The coke oven is illustrated conventionally at 1 and has the usual outlet 2 for the escape of hot coke oven gases. The modified uptake pipe is indicated at 3 and connects at its upper end with the pipe 4 leading to the ordinary collector main 5. The modified uptake pipe has an enlarged casing portion 6 and an inner upwardly extending pipe 7 forming an annular space between them. A baffle 8 is located above the upper end of the pipe 7, and above this is arranged a spray head 9 connected with the pipe 10 for supplying ammonia liquor thereto. The outlet for ammonia liquor, or ammonia liquor and tar, is located at the bottom of the enlarged casing 6, this outlet being indicated in the form of pipes 11 leading to the manifold or collector pipes 12.

The modified uptake pipe illustrated has a series of doors or openings 14 to permit inspection and cleaning, and an upper door 15 carrying the baffle 8. Overflow outlets 16 are also provided.

A series of spray nozzles 21 are located in the collector main for spraying oils, etc. therein, and the main may also be flushed with a considerable amount of hot tar or pitch indicated at 22.

A cross-over main 30 leads from the collector mains 5 to a condensing system indicated as two direct or indirect coolers or condensers 31 and 32, beyond which is located the exhauster 35. A receptacle or decanter 23 is provided for collecting the tar or oil thrown down in the cross-over main. The tar or pitch in the collector main may be drawn off from the center box through the line 24 to the receptacle or tank 25.

A storage tank containing ammonia liquor is indicated at 27 connected to the line 10 leading to the spray nozzles 9, the ammonia liquor being pumped by means of pump 28 to the spray nozzles. The ammonia liquor, or ammonia liquor and tar, drawn off from the bottoms of the individual uptake pipes and collecting in the collecting pipe 12 runs through the pipe 18 to the receptacle 19. The ammonia liquor so collected may, after settling of tar therefrom, be returned for further use in the ammonia liquor sprays.

In the operation of the apparatus illustrated, ammonia liquor is pumped to the spray nozzles and sprayed into the tops of the individual uptake pipes, the amount of ammonia liquor so sprayed being regulated to give the desired cooling of the hot coke oven gases rising from the individual coke ovens through the individual uptake pipes. The ammonia liquor which is not vaporized collects in the bottom of the uptake pipes, together with any tar thrown down thereby and runs out through the ammonia liquor outlet pipes into the separate collecting pipe 12. The cooled gases containing the water vapor from the evaporation of the ammonia liquor pass to the collector main where they may be utilized for the distillation of tar or oil in the manner above described.

By regulating the character and amount of the spray in the uptake pipe, the extent of the pre-cooling of the hot coke oven gases can be regulated and controlled, so that the gases will enter the collector main at a regulated temperature, which may be, for example, around 300 to 400° C. or higher, or which may be as low as 200° C. or lower, depending upon the operation desired in the collector main.

Where tar or oils are to be distilled in the collector main, the pre-cooling of the gases before they reach the main can be regulated so that the gases contain the necessary amount of heat units for the carrying out of the desired distillation. In this case, part of the heat of the hot coke oven gases will be absorbed by the ammonia liquor sprays in the uptake pipe and part by the tar or oils being distilled in the collecting main. The amount of distillation can be varied by raising or lowering the temperature of the gases entering the main, while the character of the residue from the distillation and of the distillate oils removed therefrom by the distillation, can be varied to give either soft or harder pitches as residues and more or less heavy distillate oils, depending upon the extent to which the distillation of the tar is effected.

The heat contained in the hot coke oven gases is many times that required for distilling an amount of tar such as the gases themselves produce. Where only a small amount of tar is available to be distilled, the greater part of the heat of the hot coke oven gases can be absorbed by the ammonia liquor and the remainder utilized for tar distillation. Where an increased amount of tar is available for distillation, the amount of ammonia liquor can be reduced and the temperature of the gases entering the collector main increased to insure that sufficient heat is available in the gases passing through the collector main for effecting the desired distillation. This distillation, moreover, will be effected by gases at a lower temperature than would be the case if the gases were not pre-cooled by the ammonia liquor spray in the uptake pipes.

The regulation of the temperature in the collector main enables the distillate oils to pass in vapor form along with the gases through the cross-over main to the condensers. The temperature of the excess gases can be raised or lowered to insure that vapors of a higher or lower boiling or condensation temperature pass over to the condensers. The invention makes possible the elevation of the temperature of the gases passing from the collector main to a much higher temperature than commonly employed for such gases, so that an increased amount of heavy oil vapors are carried over to the condensers. The vapors, moreover, are relatively clean vapors in the sense that they have had heavier tar constituents removed therefrom to a greater or less extent by the action of the ammonia liquor in the uptake pipes and the action of the tar or oil sprays in the collector main, while the normal vapor content of the gases is very considerably increased by the distillation of tar or oils in the collector main, and the production of a considerable amount of clean vapors by such distillation.

It will thus be seen that the invention provides for regulation of the temperature of the hot coal distillation gases by cooling them with water or ammonia liquor while they are at practically their maximum temperature and before they reach the collector main, the cooling of the gases being, however, regulated and limited so that the gases enter the collector main at a sufficiently high temperature to insure that the greater part of the oil constituents are still in the vapor form, and at a sufficiently high temperature so that distillation of tar or oils can be effected thereby. The collector main operation, when tar or oil is distilled therein, is carried out at a regulated lower temperature, but a temperature nevertheless sufficiently high to enable effective distillation to be carried out with production of heavy tar or pitch residues and distillate oils. The operation of the collector main in any event is at a sufficiently high temperature so that the gases leaving the collector main and passing to the condensing system contain a large amount of condensable oil constituents in the form of vapors, including not only those which have been distilled from the tar or oil in the collector main, but also a large part of the original oil vapors of the gases leaving the coke ovens so that these are directly recovered as condensed oils in the condensing system.

The cooling of the gases immediately after they leave the coke oven has an additional advantage; yields of ammonia recoverable from the coke oven gases are in general improved the quicker the hot gases can be sharply reduced in temperature. My invention has therefore several distinct advantages which will be readily understood by those familiar with coke oven operation. Yields of ammonia will be improved; difficulty due to pitching of the collector main will be reduced; distillation of tar or oil in the collector main can easily be regulated; much less carbon will accumulate in the uptakes and goosenecks than is ordinarily the case.

The term "tar" as used herein is intended to include tar from which a portion of the oils have been removed by distillation and which is sometimes spoken of as pitch, but which may be further distilled yielding additional distillate oils.

I claim:—

1. The method of distilling tar and producing pitch and distillate oils, which comprises spraying fresh hot coal distillation gases with a limited amount of ammonia liquor so as to cool them and yet leave them at a temperature sufficiently high to permit their use for effecting the distillation of tar to pitch, collecting non-volatilized ammonia liquor resulting from the spraying and then using the gases which are still hot for the distillation of tar by spraying it into them thereby vaporizing oils from the tar and producing pitch.

2. The improvement in the operation of a coke oven battery the ovens of which are connected thru uptake pipes with a gas collector main, which comprises spraying the fresh hot coal distillation gases passing from the ovens to the collector main with ammonia liquor in the uptake pipes so as to cool the gases somewhat and yet leave them at a temperature sufficiently high to permit their use for effecting the distillation of tar to pitch, separately collecting any non-volatilized ammonia liquor resulting from the spraying without allowing it to enter the collector main, and distilling tar to pitch in the collector main by spraying it in the main into the gases which have been cooled to a limited extent by spraying with ammonia liquor.

3. The method of distilling tar and producing pitch and distillate oils, which comprises cooling fresh hot coal distillation gases with a limited amount of cooling liquid so that the gases are retained at a temperature sufficiently high to permit their use for effecting the distillation of tar to pitch, using the partly cooled gases which are still hot for the distillation of tar by spraying it into them, thereby vaporizing oils from the tar and producing pitch, and withdrawing the pitch from contact with the gases while the gases are at a temperature not above that to which they were cooled in the cooling step.

4. The method of distilling tar and producing pitch and distillate oils, which comprises spraying fresh hot coal distillation gases with a limited amount of cooling liquid so as to cool the gases and yet leave them at a temperature sufficiently high to permit their use for effecting the distillation of tar to pitch, using the gases which are still hot for the distillation of tar by spraying it into them, thereby vaporizing oils from the tar and producing pitch, and withdrawing the pitch from contact with the gases while the gases are at a temperature not above that to which they were cooled in the cooling step.

5. The method of distilling tar and producing pitch and distillate oils with comprises spraying fresh hot coke oven gases resulting from the distillation of coal in coke ovens with a limited amount of an aqueous solution, so as to cool the gases to a temperature between 100 and 200° C., bringing tar into contact with the resulting gases so as to distill the tar to pitch and then cooling the resulting gases to separate therefrom oils originaly present in the coke oven gases and oils distilled from the tar.

STUART PARMELEE MILLER.